United States Patent Office 3,093,845
Patented June 18, 1963

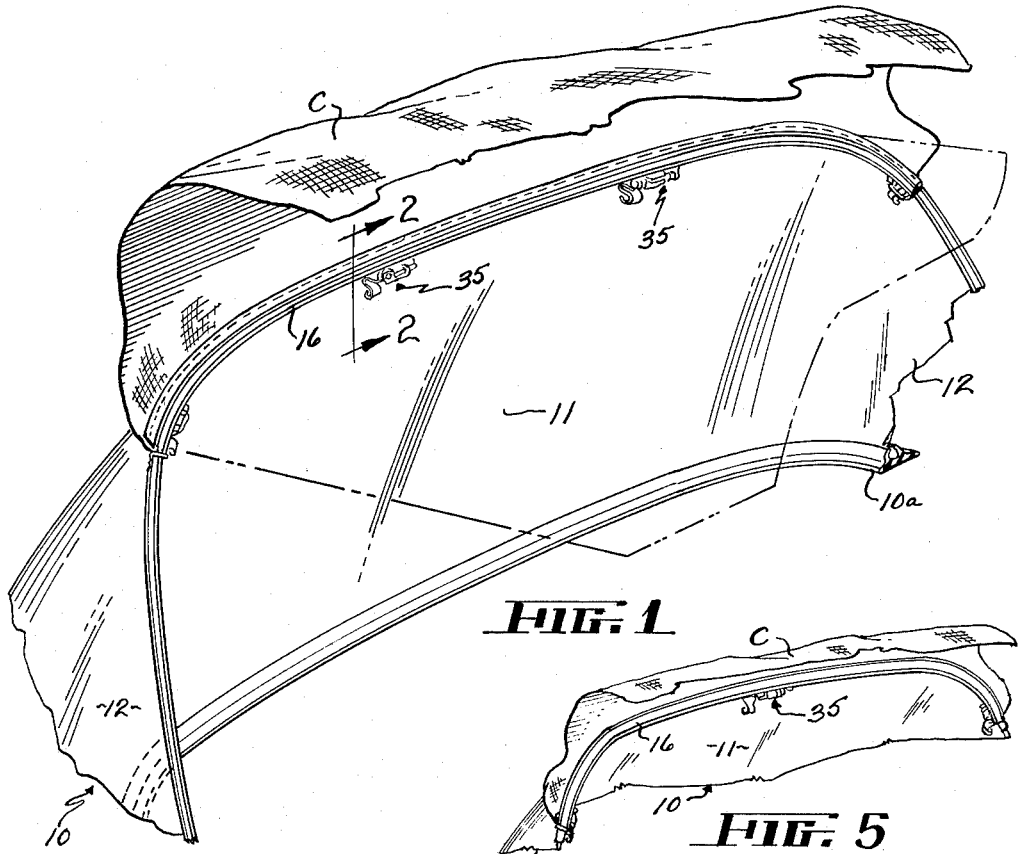
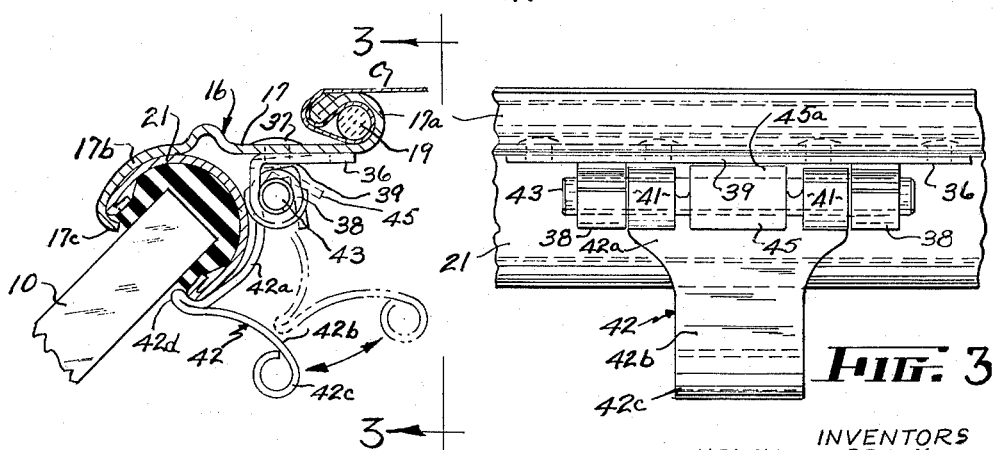

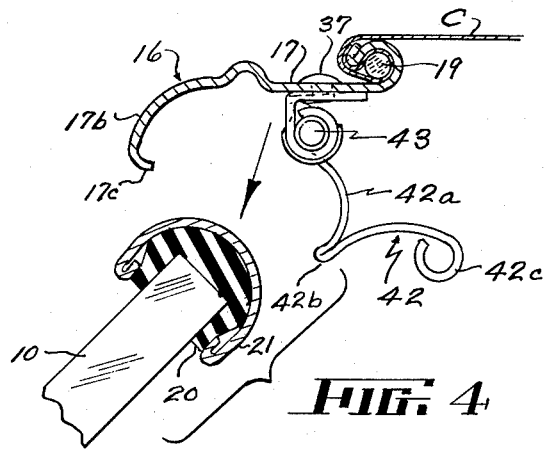
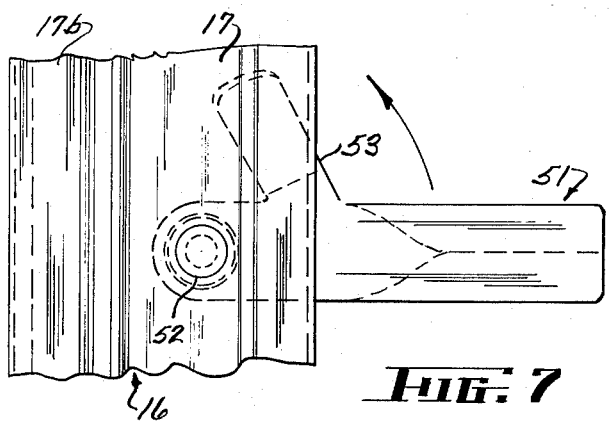
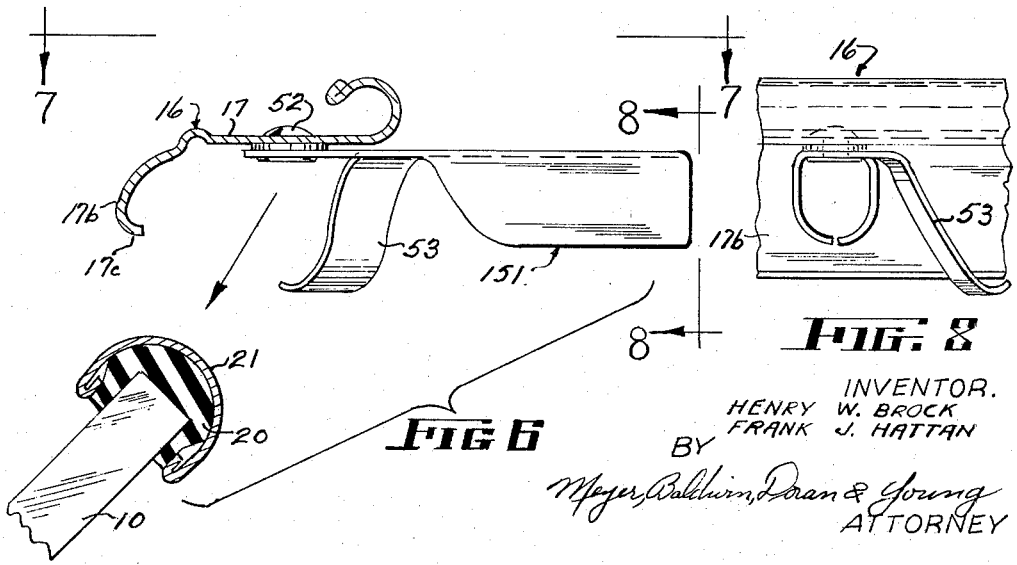

3,093,845
WINDSHIELD STRUCTURE
Henry W. Brock, Willoughby, and Frank J. Hattan, Parma, Ohio, assignors to The Standard Products Company, Cleveland, Ohio, a corporation of Ohio
Filed Mar. 28, 1961, Ser. No. 98,841
1 Claim. (Cl. 9—1)

This invention relates to a new and improved windshield structure and more particularly to a structure wherein a flexible closure or cover is detachably fastened to the peripheral edge of the windshield of said structure.

The windshield structure of the present invention has particular utility for use in detachably fastening a flexible closure or cover to the peripheral edge of a windshield utilized in a boat or like watercraft wherein the peripheral edge of the windshield is substantially non-planar in its longitudinal configuration.

Heretofore, in windshield structures for use on boats or like watercraft, wherein the windshield of said structure is mounted in an upright windshielding position so as to extend substantially laterally across the boat and the bottom longitudinal windshield edge is securely attached to the deck of said boat, to thereby leave the upper peripheral edge thereof free of any supporting framework, the flexible cover of said structure has usually been fastened directly to the aforesaid free peripheral edge, said securement being accomplished by detachable fasteners such as for example by the type referred to as a "snap fastener" and/or the type utilizing an eyelet attached to the cover and which is impaled upon an anchoring pin or like member secured to the windshield. In the use of such fastening means, the several cooperating parts thereof are usually arranged in preselected spaced relation along the associated portions of the cover and windshield peripheral edge to be fastened together.

As will be recognized, a decided disadvantage in the use of fastening means of this type among others, is that the same requires the cover be substantially placed in the position it is intended to occupy in its assembled relation with said windshield prior to fastening said cover to said windshield to thereby assure that the cooperating parts of each fastening means are aligned with each other and that said cover will therefore be properly positioned in said assembled relation. Still another disadvantage to the use of fastening means of the aforesaid type which directly fasten the closure cover to the windshield is that isolated stresses are developed at each area of fastening and which are oftentimes effective to cause tearing of the cover and/or separation of the latter from its fastening means.

Other disadvantages in prior windshield structures and/or the fastening means used therein to detachably fasten the flexible cover to the windshield of said structures will be recognized by the artisan which will, in part, explain why said structures have thus far found only limited utility in the related arts.

It is therefore a primary object of the present invention to provide a new and improved windshield structure especially designed to detachably fasten a flexible closure or cover to the peripheral edge of an upstanding windshield utilized with a boat or like watercraft and which has a plurality of peripheral edge portions angularly spaced relative to each other, the instant structure including rigid cover alignment means for aligning said closure or cover with said peripheral edge portions and to effect a detachable securement of said cover to said edge.

Another object of the present invention is the provision of a new and improved windshield structure especially designed to detachably fasten a flexible closure or cover to the peripheral edge of a windshield utilized with a boat or like watercraft, wherein merely the bottom edge of said windshield is securely fastened to the deck of said boat, said windshield being thereby disposed in an upright position, the remaining peripheral edge portions being substantially free of supporting framework and angularly spaced relative to each other, the instant structure including substantially rigid cover alignment means shaped to conform to the contour of said remaining peripheral edge portions and effective to align said cover with the same and for detachably fastening said cover to said windshield edge portions.

Another object of the present invention is to provide a new and improved windshield structure as is defined in the preceding paragraphs and which, in addition, includes fastening means located at predetermined intervals along said windshield peripheral edge and the alignment means and which fastening means are operable to detachably fasten said cover to said windshield peripheral edge.

Additional objects and advantages of the windshield structure of the present invention will be apparent to one skilled in the art to which it pertains, and upon reference to the following description of several preferred embodiments thereof, and which embodiments are illustrated in the accompanying drawings wherein:

FIG. 1 is a fragmentary perspective view of one windshield structure embodying the present invention;

FIG. 2 is a vertical sectional view taken on approximately the plane as is indicated by the line 2—2 in FIG. 1, and showing one form of fastening means;

FIG. 3 is a vertical elevational view taken approximately on the plane as is indicated by the line 3—3 in FIG. 2;

FIG. 4 is a vertical sectional view showing the cover alignment bar and attached cover in the position occupied thereby just prior to its being detachably fastened to the peripheral edge of the windshield;

FIG. 5 is also a fragmentary perspective view illustrated on a smaller scale of the embodiment of FIG. 1 however showing in its instant assembly a series of only three fastening means for detachably fastening the cover to the peripheral windshield edge;

FIG. 6 is a vertical sectional view of a second embodiment of fastening means adapted for use in the windshield structure of the present invention;

FIG. 7 is a plane view taken approximately on the plane as indicated by the line 7—7 in FIG. 6; and FIG. 8 is a vertical elevational view taken on the plane as is indicated by the line 8—8 in FIG. 6.

In the embodiment of windshield structure illustrated herein, and which as is aforementioned, is especially designed for use with a boat or like watercraft (not shown), the configuration of windshield 10 illustrated herein is that type known in the art as a "wrap around" windshield which has a central portion 11, which may be either substantially straight or slightly curved in its longitudinal extension, and side or wing portions 12 integrally formed on opposite ends of said central portion 11 and which curve longitudinally outwardly and rearwardly therefrom.

As is well known, the windshield is usually mounted in an upright windshielding position on the deck of the boat forwardly of and across the cockpit so that only the bottom peripheral edge portion of the same is securely attached to said deck to thereby leave the remaining peripheral edge portions free of any supporting structure attached to said boat deck.

In the instant windshield assembly, the bottom peripheral edge is preferably mounted within a trim strip 10a adapted to be attached to said boat deck.

It is also to be understood that although the disclosed embodiment of windshield is the "wrap around" type, the instant disclosure is not intended to define any limitations for the particular configuration of windshield utilized therewith, the novel windshield structure of the present invention as will be later realized herein, being especially designed for use with a windshield of any selected configuration wherein its peripheral edge portions are disposed in non-planar relation to each other.

As is aforementioned, the windshield structure of the present invention includes alignment means for aligning the closure cover relative to the peripheral edge of the windshield and for enabling the detachable securement of said cover to said windshield.

To accomplish this, the instant form of cover alignment means is seen to comprise a rigid alignment bar 16 which is preferably constructed of a suitable metallic material such as aluminum or stainless steel, and which has a longitudinal configuration conforming to the peripheral edge portions of the central section of the windshield and likewise to at least portions of the connecting peripheral side edge portions 12 of said windshield.

As best seen in FIG. 3, the alignment bar 16, in vertical section, is seen to comprise a substantially flat central portion 17 integrally formed at its one end with an upwardly extending and reversibly bent bead portion 17a, and at its opposite end with a forwardly projecting and downwardly curving wall 17b, said wall terminating in a rearwardly bent lip portion 17c.

The front edge of the closure or cover C is intended to be securely anchored to the alignment bar 16, and for this purpose said cover edge is wrapped around a core member as is indicated at 19, and which is preferably formed of a suitable flexible material such as cord or the like, said core having dimensions which permit its being snapped into the bead portion 17a of said bar and thereby resiliently retained therein to thus securely fasten said cover edge to said bar.

To protect the free peripheral edge of the windshield from being inadvertently damaged as a result of assembly and/or disassembly of the instant windshield structure and to likewise provide means for enabling the attachment of said cover to said peripheral edge, a suitable seal strip 20, substantially C-shaped in vertical section and preferably formed of a soft rubber-like material is placed over said free peripheral edge, said strip in addition, being preferably encased within a rigid channel 21 which also has a longitudinal configuration conforming to the contour of said peripheral edge and which in addition, is effective to secure said seal strip 20 in place over said windshield edge.

As best seen in FIGS. 1 and 3, the rigid alignment bar 16 and attached cover C are shown in the assembled relation therefore with the free peripheral edge of the windshield, whereby the curved wall part 17b of said cover alignment bar is placed over the channel 21 with the aforementioned lip portion 17c thereof extending downwardly and underneath the adjoining longitudinal edge of the channel 21.

As will be realized, with the cover alignment bar 16 having substantially the same longitudinal configuration as the free peripheral edge of the windshield and said channel, it may only be placed in said assembled relation with said windshield edge when it is in substantial longitudinal alignment with the same. And as will be further realized, once said bar is in said aligned position it is not possible to shift the same laterally of the boat or longitudinally along said windshield, and consequently said alignment bar and attached cover may be disposed in only one position when in said assembled relation.

Fastening means are provided in the instant windshield structure to detachably fasten the cover to the peripheral windshield edge when the cover alignment bar 16 is in said assembled relation. For this purpose, a plurality of fastening means are preferably used in the instant assembly, each being identified in its entirety by the reference numeral 35, and which are arranged at predetermined spaced intervals longitudinally along the aforementioned free windshield peripheral edge, the assembled embodiment of windshield structure shown in FIG. 1 utilizing a series of four of said fastening means whereas, in FIG. 5, there is herein disclosed a similar windshield structure using a series of three of said fastening means preferably having one centrally disposed along said windshield and one equally spaced on either side thereof and cooperating with the side portions of said windshield.

In its present form, each of the fastening means is seen to include a hinge plate 36 rigidly fastened by means of rivets 37 to the underside of the cover aligning bar 16, each of said hinge plates being integrally formed with a pair of spaced eyelets 38 depending downwardly therefrom. The hinge plate 36, in addition, is centrally provided with an arm as identified at 39, the latter being preferably struck from said plate so as to project downwardly between said eyelets.

Each of said fastening means also includes a latch member 42 substantially V-shaped in side elevation as best seen in FIG. 3, its one leg 42a being curved to approximate a portion of the contour of the aforementioned channel 21, on the side thereof opposite the portion underlying the cover alignment bar 16. Said latch leg 42a is formed on its extremity with a pair of spaced hinge eyes 41. Said keeper member is placed in proximity to the aforementioned hinge plate to thus position said closed eyes 41 intermediate the spaced eyelets 38 on said plate 36 and in axial relation thereto to thus accommodate a hinge pin 43, the latter passing completely through said eyelets and closed hinge eyes as best seen in FIG. 3. In this manner, each of the latch members is swingably attached to its associated hinge plate so as to swing toward and/or away from the front wall portion 17b of the alignment bar 16.

The leg 42a of the latch member, as may be best seen in FIGS. 3 and 4, is also provided at its said one end, intermediate the aforementioned hinge eyes 41, with a curved arm 45 having an elbow 45a formed at its medial part, said arm being preferably struck from the end of said latch member leg so as to be integral therewith.

The opposite leg 42b of said latch member is seen to be provided at its free end with a finger gripping part 42c to facilitate manipulation of said latch member.

With this assembly, the cover alignment bar 16 and attached cover C may be placed in its assembled relation over the channel 21 and each of the latch members 42 may then be swung about the hinge pin 43 in a clockwise direction from its dotted line "unlatched" position as shown in FIG. 2 to its solid line "latched" position effective to carry its curved leg 42a into partial engagement with said channel opposite the aforementioned front wall 17b of the alignment bar 16, the apex portion 42d of said latch member extending around and underneath the inner edge of said channel, the dimensions of said latch member being preferably selected so that the apex portion thereof is snapped into said position to thereby detachably fasten the alignment bar to said channel. In its "latched" position, the latch member 42 is preferably swung forwardly thereby swinging the curved arm 45 over and beyond the center of rotation thereof (hinge pin 43) whereby its elbow portion 45b resiliently engages the arm 39 on the hinge plate 36 tending to flex the same upwardly said curved arm 45 being flexible to thus resiliently retain said latch member in its "latched" position.

In FIGS. 6 to 8, inclusive, there is herein shown a second embodiment of fastening means for detachably fastening the cover alignment bar 16 and attached cover C to the peripheral windshield edge.

In said modified form, the fastening means is seen to comprise a lever 51 pivotally mounted at its one end by means of pin 52 to the underside of the cover alignment bar 16 preferably to the central flat portion thereof, said lever being thereby swingable toward and away from said bar about an axis substantially perpendicular to the plane of the cover alignment bar 16.

The lever 51 is seen to be integrally formed with a downwardly curved and forwardly projecting latching finger 53, extending substantially laterally outwardly from said lever, said finger being preferably spaced longitudinally along said lever from its pivoted end.

The latching finger of each lever 51 is intended to cooperate with the downwardly projecting wall portion 17b of the cover alignment bar 16 to resiliently embrace the channel 21 mounted on the windshield peripheral edge, and thereby detachably fasten the alignment bar and attached cover C to the peripheral windshield edge.

As seen in FIG. 7, the lever 51 is in its "unlatched" position with respect to the cover alignment bar 16, and from this position said lever may be swung in a counter-clockwise direction so as to bring the latching finger 53 thereof into latching engagement with the adjacent side of the channel 21, said finger cooperating with the forwardly projecting wall 17b of the alignment bar 16 being thereby effective to detachably fasten the alignment bar 16 and attached cover C to the free peripheral windshield edge.

As in the previous embodiment of windshield structure, the instant assembly may also use any desired number of fastening means arranged in any preselected relation along the cover alignment bar 16.

As will now be realized an important structural feature evident in each embodiment disclosed herein relates to the fact that each of the fastening means used therein is mounted on the cover alignment bar 16 being located thereon, as above mentioned, in any preselected arrangement whereby all that is needed to detachably fasten said bar to the free peripheral edge of the windshield is to place said bar in its longitudinally aligned, non-shiftable position over the channel 21 disposed on said edge and to thereafter actuate each of said fastening means to its "latched" position. As will be further realized, each of said fastening means cooperates with the forwardly projecting wall 17b on the aforesaid alignment bar 16 to thereby detachably fasten said bar and attached cover to said windshield peripheral edge.

Having thus described in detail several preferred embodiments it will be realized by one skilled in the art to which it pertains that the windshield structure of the present invention is susceptible to various modifications, combinations, and arrangements of parts without departing from the inventive concepts thereof as are defined in the appended claim.

What is claimed is:

In combination, a windshield having a peripheral edge which includes a middle section and sections on opposite sides thereof longitudinally deviating from said middle section, a seal strip mounted over said peripheral edge, a rigid channel having a longitudinal configuration conforming to the contour of said peripheral edge and clamped over said seal strip being effective to secure said strip on said edge, means for detachably connecting a cover to said peripheral edge comprising a rigid bar-like member shaped to longitudinally conform to the middle section of said windshield and to at least portions of the deviating side sections thereof, means for securely fastening one edge of said cover to said bar-like member, said bar-like member having a cross sectional configuration conforming to the transverse contour of the outer surface of said channel whereby in assembled relation with said channel said bar-like member is clamped over said outer channel surface, and latch means carried on said bar-like member movable into latching engagement with said channel effective to retain said bar-like member on said channel.

References Cited in the file of this patent

UNITED STATES PATENTS

| | | |
|---|---|---|
| 2,937,652 | Zimmer et al. | May 24, 1960 |
| 2,961,725 | McGee | Nov. 29, 1960 |
| 3,001,212 | Towne | Sept. 26, 1961 |

FOREIGN PATENTS

| | | |
|---|---|---|
| 298,094 | Switzerland | Apr. 30, 1954 |
| 1,113,961 | France | Dec. 12, 1955 |